（12） United States Patent
Kline et al.

(10) Patent No.: US 11,209,533 B2
(45) Date of Patent: Dec. 28, 2021

(54) QUADRATURE AMPLITUDE MODULATION CIRCUITRY FOR ULTRASONIC TRANSDUCER

(71) Applicant: Chirp Microsystems, Inc., Berkeley, CA (US)

(72) Inventors: Mitchell Kline, Berkeley, CA (US); Richard Przybyla, Berkeley, CA (US); David Horsley, Berkeley, CA (US)

(73) Assignee: CHIRP MICROSYSTEMS, INC., Berkeley, CA (US)

( * ) Notice: Subject to any disclaimer, the term of this patent is extended or adjusted under 35 U.S.C. 154(b) by 923 days.

(21) Appl. No.: 15/958,363

(22) Filed: Apr. 20, 2018

(65) Prior Publication Data

US 2018/0246193 A1    Aug. 30, 2018

Related U.S. Application Data

(63) Continuation of application No. PCT/US2016/057969, filed on Oct. 20, 2016.

(60) Provisional application No. 62/244,550, filed on Oct. 21, 2015.

(51) Int. Cl.

| | |
|---|---|
| *G01S 15/00* | (2020.01) |
| *G01S 7/524* | (2006.01) |
| *B06B 1/02* | (2006.01) |
| *G01S 7/521* | (2006.01) |
| *G01S 15/10* | (2006.01) |

(Continued)

(52) U.S. Cl.
CPC ............ *G01S 7/524* (2013.01); *B06B 1/0215* (2013.01); *G01S 7/521* (2013.01); *G01S 7/526* (2013.01); *G01S 15/102* (2013.01); *G01S 15/325* (2013.01)

(58) Field of Classification Search
USPC ........................................................ 367/137
See application file for complete search history.

(56) References Cited

U.S. PATENT DOCUMENTS

| | | | |
|---|---|---|---|
| 6,167,758 B1 | 1/2001 | Fomitchev | |
| 7,215,599 B2 * | 5/2007 | Nishimori | ........... G01S 7/52003 367/137 |

(Continued)

OTHER PUBLICATIONS

International Search Report dated Jan. 24, 2017 for International Patent Application No. PCT/US2016/057969.

(Continued)

*Primary Examiner* — James R Hulka
(74) *Attorney, Agent, or Firm* — JDI Patent; Joshua D. Isenberg; Robert Pullman

(57) ABSTRACT

An ultrasonic transmitter system includes a digital controller, bandpass pulse-width modulator (BP-PWM) unit, a digital to analog converter (DAC), and an ultrasound transducer. The controller generates pulse width and phase reference signals. The BP-PWM configured receives these signals generates a pulse width modulation (PWM) output characterized by a pulse width and a phase based on the pulse width and phase reference signals. The DAC) receives the PWM output from the BP-PWM unit and generates an output characterized by the pulse width and phase. The ultrasonic transducer receives the output from the DAC and generates an output sound pressure in response to the output from the DAC. An amplitude of the RMS sound pressure depends on the pulse width of the output from the DAC.

10 Claims, 4 Drawing Sheets

(51) Int. Cl.
*G01S 15/32* (2006.01)
*G01S 7/526* (2006.01)

(56) References Cited

U.S. PATENT DOCUMENTS

| | | | | |
|---|---|---|---|---|
| 7,224,219 B2* | 5/2007 | Spencer | ................ | H03F 3/2171 |
| | | | | 330/10 |
| 7,269,098 B2* | 9/2007 | Nishida | ................ | B06B 1/0223 |
| | | | | 367/137 |
| 7,824,335 B2* | 11/2010 | Wodnicki | ........... | G01N 29/0654 |
| | | | | 600/437 |
| 7,889,787 B2* | 2/2011 | Shifrin | ................ | G01S 7/52017 |
| | | | | 375/238 |
| 8,179,957 B2* | 5/2012 | Bryant | .................... | H03F 3/217 |
| | | | | 375/238 |
| 9,116,229 B2* | 8/2015 | Shifrin | ................ | G10K 11/346 |

| | | |
|---|---|---|
| 2003/0039173 A1 | 2/2003 | Yurchenko et al. |
| 2004/0184351 A1 | 9/2004 | Nishimori et al. |
| 2005/0007879 A1 | 1/2005 | Nishida |
| 2005/0033168 A1 | 2/2005 | Shifrin |
| 2007/0015473 A1 | 1/2007 | Spencer |
| 2008/0200809 A1 | 8/2008 | Shifrin |
| 2008/0264171 A1 | 10/2008 | Wodnicki |
| 2009/0149151 A1 | 6/2009 | Bryant |

OTHER PUBLICATIONS

Alexander Ens, et al., "Multicarrier Airborne Ultrasound Transmission with Piezoelectric Transducers", in IEEE Transactions on Ultrasonics, Ferroelectrics, and Frequency Control; vol. 62, No. 5, May 2015; IEEE.

Extended European Search Report dated May 27, 2019 for Patent Application No. 16858242.7.

* cited by examiner understand# QUADRATURE AMPLITUDE MODULATION CIRCUITRY FOR ULTRASONIC TRANSDUCER

CLAIM OF PRIORITY

This Application is a continuation of International Patent Application Number PCT/US2016/057969, filed Oct. 20, 2016, the entire contents of which are incorporated herein by reference. International Patent Application Number PCT/US2016/057969 claims the priority benefit of U.S. Provisional Patent Application No. 62/244,550 filed Oct. 21, 2016, the entire contents of which are incorporated herein by reference.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE DISCLOSURE

The present disclosure is related to ultrasonic transducers and more particularly to pulse width modulation of ultrasound transducers

BACKGROUND OF THE DISCLOSURE

Ultrasonic transducers typically present a large capacitive load to driving circuitry and require high voltage actuation. These restrictions, along with the requirement for low power, often lead to a choice of square-wave drive. The transducer is connected to only two (or sometimes three) discrete voltage levels in a periodic fashion at predetermined switching intervals. For example, in FIG. 1, a transducer 10 is driven by a digital to analog converter (DAC) 11 with input taken from a square wave generator 12, which is driven by a digital control signal 13. The square wave is typically chosen to be a fixed frequency and produces a digital output having two levels: a high level and a low level. The DAC 11 connects the transducer 10 to V+ when the square wave is high and 0 when the square wave is low. In FIG. 2, the transducer 10 is driven with a 3-level square wave. The transducer is driven to V+ when the square wave output is high and V− when the square wave is low. When the input digital control signal is low, the DAC output is 0.

The solution represented by FIGS. 1 and 2 does not require any high-performance linear analog circuitry. It is low power and easy to implement with simple components. This is largely because the DAC only produces 2 or 3-levels; it can be implemented from only a few switches that multiplex the ultrasound transducer terminal to the different supply voltage(s) or ground. The drawback is that the transducer can only produce full-scale RMS sound pressure output or nothing, i.e., it is only on or off. In this invention, modulation of the switching intervals is used to increase the number of RMS sound pressure levels available.

SUMMARY OF THE DISCLOSURE

According to aspects of the present disclosure, an ultrasonic transmitter system may include a digital controller, a bandpass pulse-width modulator (BP-PWM) unit, a digital to analog converter (DAC), and an ultrasound transducer. The digital controller is configured to generate pulse width and phase reference signals. The BP-PWM unit is configured to receive the pulse width and phase reference signals from the digital controller and generate a pulse width modulation (PWM) output based on the pulse width and phase reference signals. The PWM output is characterized by a pulse width and a phase. The DAC is configured to receive the PWM output from the BP-PWM unit and generate an output characterized by the pulse width and phase. The ultrasonic transducer is configured to receive the output from the DAC and generate an output sound pressure in response to the output from the DAC. An amplitude of the RMS sound pressure depends on the pulse width of the output from the DAC.

In some implementations, the BP-PWM unit may have a programmable pulse width.

In some implementations, the ultrasound transducer's RMS sound pressure level output is determined by an amplitude of the output from the DAC as well as a pulse width setting of PWM output.

In some implementations, the digital controller is configured to generate a phase offset signal and wherein the BP-PWM unit is configured to receive the phase offset signal and generate the PWM output based on the pulse width, phase reference and phase offset signals. In such implementations, a phase of the output sound pressure from the ultrasound transducer is determined by the phase offset signal.

In some implementations, the digital controller generates the phase reference signal in the form of a digital phase ramp.

In some implementations, the ultrasonic transducer is a piezoelectric micromachined ultrasonic transducer (PMUT) or a capacitive micromachined ultrasonic transducer (CMUT).

DETAILED DESCRIPTION

Introduction

Figure 1:
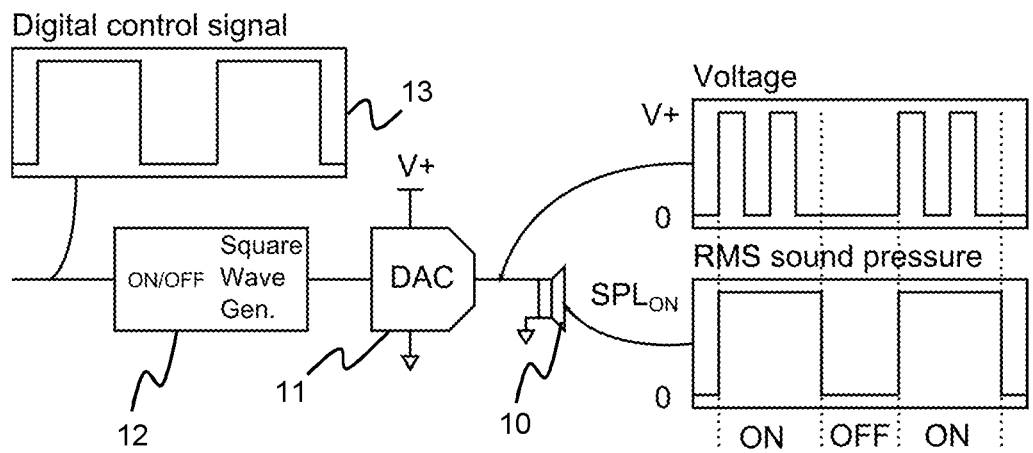
FIG. 1 is a schematic diagram depicting driving an ultrasound transducer with a 2-level square wave (prior art).
Figure 2:
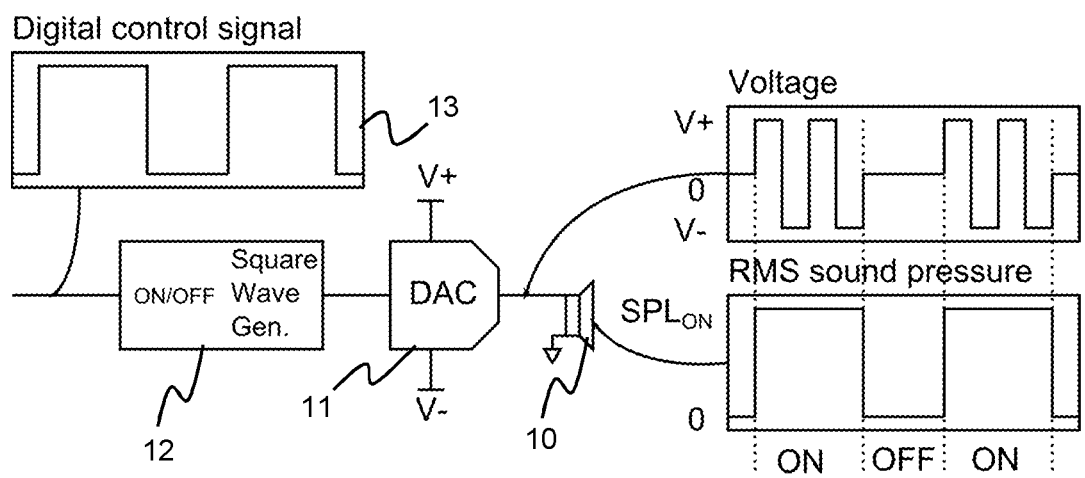
FIG. 2 is a schematic diagram depicting driving an ultrasound transducer with a 3-level square wave (prior art).

According to aspects of the present disclosure an intermediate RMS sound pressure level can be created using pulse width modulation without requiring additional discrete voltage levels, while preserving the power efficiency and simplicity of the driving schemes shown in FIG. 1 and FIG. 2.

Figure 4:
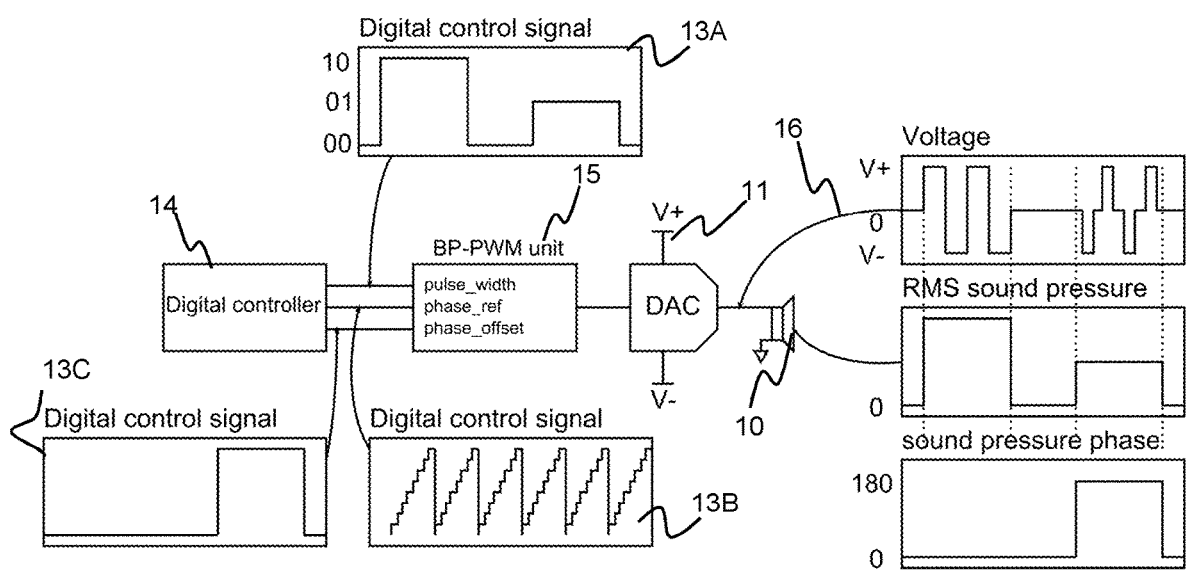
FIG. 4 is a block diagram showing amplitude and phase modulation of transducer output sound pressure level in accordance with aspects of the present disclosure.

With additional RMS sound pressure levels, it is straightforward to encode a multi-bit message signal into the ultrasound domain. For example, if 2 bits of RMS sound pressure control are available, a 2 bit message signal can be uniquely mapped to the RMS sound pressure levels. The method of mapping the RMS value of a carrier signal (in this case ultrasound) to a message signal is known as amplitude modulation and has numerous applications in the communication and control fields. The amplitude modulation technique can be extended to quadrature amplitude modulation by adjusting the phase of the output sound in addition to the RMS pressure level. This aspect of the disclosure is shown in FIG. 4. Extension to quadrature amplitude modulation (QAM) increases the number of message symbols. For example, adding 1-bit of phase control doubles the number of message symbols. The symbol mapped to full amplitude at phase 0 can be distinguished from the symbol mapped to full amplitude at phase 180 degrees. According to aspects of the present disclosure, the QAM transmitter enables transmission of QAM-modulated data from one ultrasound transmitter to a second ultrasound receiver. In another embodiment, the QAM transmitter is used to uniquely encode the phase and amplitude of the ultrasound signal transmitted by an ultrasound transmitter. This encoding, similar to a technique used in wireless communication known as code division multiple access (CDMA), enables the signals of several different ultrasound transmitters to be uniquely identified even when the transmitters are operating simultaneously. This encoding has numerous applications including enabling the simultaneous operation of multiple ultrasonic pulse-echo rangefinders. Another benefit of QAM modulation is the ability to cancel the ring-down of the transducer effectively. The transducer is a moderately high-quality-factor Q device, with Q typically in the range of 1 to 100. The Q of the transducer roughly equates to how many cycles it takes for the transducer to stop ringing once it is no longer actively driven. This period of ringing is referred to as the transducer's ring-down. The ring-down limits the ability of the transducer to detect echoes from close targets. This is because the ring-down signal is often orders of magnitude larger than a returning echo signal. For example, if the ring-down period is 50 μs, the transducer will have difficulty detecting echoes from targets closer than about 9 mm away (accounting for round trip delay and 343 m/s speed of sound). With the QAM transmitter, the transducer can be driven with a reverse phase during the ring-down period. Reversing the phase of the drive voltage helps to quickly reduce the ringing so that close targets can be observed. It is also beneficial to have control over the amplitude of the drive voltage to perform ring-down cancellation. In this way, a linear negative feedback loop can be constructed that results in the best cancellation of the ring-down signal.

Figure 3:
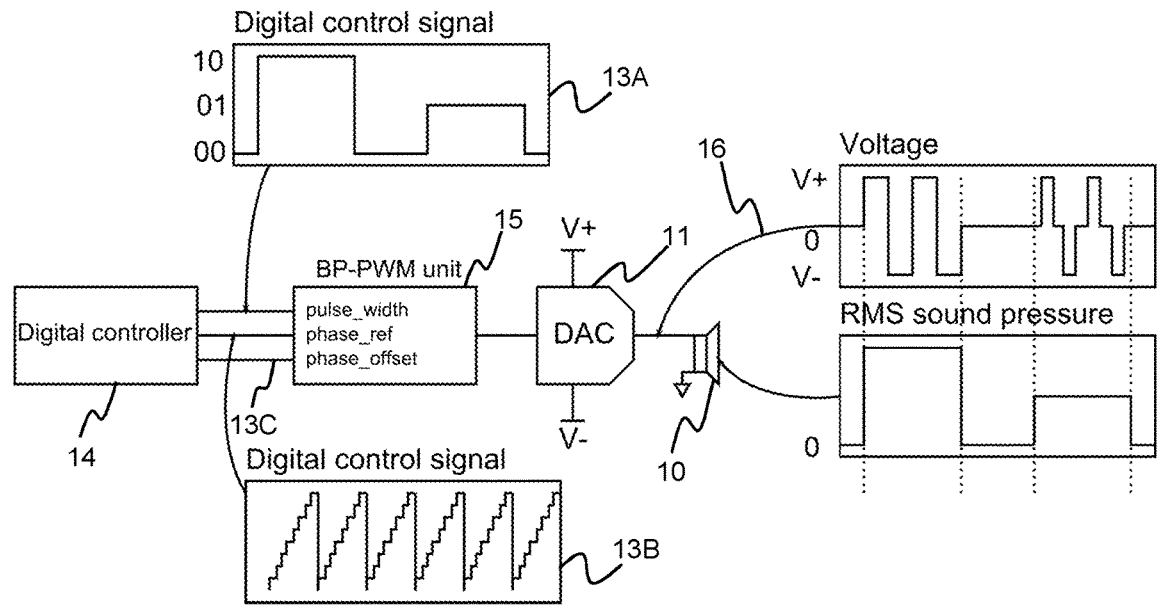
FIG. 3 is a block diagram showing amplitude modulation of transducer output sound pressure level in accordance with aspects of the present disclosure.

FIG. 3 shows a block diagram of an ultrasonic transducer system in accordance with an aspect of the present disclosure. The system includes a digital controller 14, a bandpass pulse-width modulator (BP-PWM) unit 15, a digital to analog converter (DAC) 11, and an ultrasonic transducer 10. Digital control signals are generated by a digital controller 14, which may be, e.g., a microcontroller, microprocessor or state machine implemented via digital logic.

The controller 14 generates three signals of interest: a pulse width signal 13A, phase reference signal 13B, and a phase offset signal 13C. The pulse width signal 13A controls the width of the pulses as at the output of a bandpass pulse width modulation (BP-PWM) unit 15. Longer pulse widths (up to half the period of the output waveform) result in higher RMS sound pressure output. The phase_reference signal controls the timing of the output waveform. For example, if the phase_reference signal 13B has 4-bit resolution (i.e., corresponding to decimal values from 0 to 15), at phase reference=8, the waveform is half-way through the cycle. At phase_reference=0, the waveform is at the beginning. The phase reference may be produced by a counter that increments on each clock edge. In an alternative implementation, instead of using a counter, the phase reference may be generated from many different non-overlapping phases of the input clock. The idea is that if a first phase is high, the corresponding output phase reference should be 0, if the next phase is high, the corresponding output phase reference should be 1, if the next phase after that is high, the corresponding output phase reference should be –1, etc.

The phase_offset signal allows abruptly advancing the phase of the waveform. For example, if phase_reference=0, the phase offset can be set to 8 to immediately advance the waveform by a half-cycle. In accordance with aspects of this disclosure, digital controller 14 can use the pulse_width, phase_reference, and phase_offset input signals to QAM encode a message or code into the phase and amplitude of the transmitted output sound pressure (e.g., one or more ultrasound pulses). This encoding can be used either to transmit data through the ultrasound channel or to uniquely encode the ultrasound pulse(s) generated from a given ultrasound transmitter to enable the simultaneous operation of two or more ultrasound transmitters.

The BP-PWM unit 15 uses the above described pulse_width, phase_reference, and phase_offset input signals to form the modulated digital signal that is applied to the transducer 10. FIG. 3 shows that changing the pulse_width signal 13A input to the BP-PWM unit 15 results in narrowing of the pulses applied to the transducer 10, which reduces the RMS sound pressure output.

FIG. 3 also shows a typical phase_reference signal 13B. The period of the phase reference is the same as the period of the square wave output of the BP-PWM 15. The BP-PWM unit effectively maps the phase ramp signal 13B to a pulsed square-wave input to the DAC 11, which produces a corresponding square wave output 16 that drives the transducer 10. This mapping is described in detail below.

FIG. 4 is an extension of FIG. 3 that also shows the effect of changing the phase_offset input signal 13C. In this case, a 1-bit phase_offset control signal is shown. Using 1-bit, we can choose to transmit a 0-degree phase shifted signal or a 180-degree phase shifted signal. Observe that the phase of the DAC output waveform 16 flips by 180-degrees when phase_offset=1.

Figure 5:
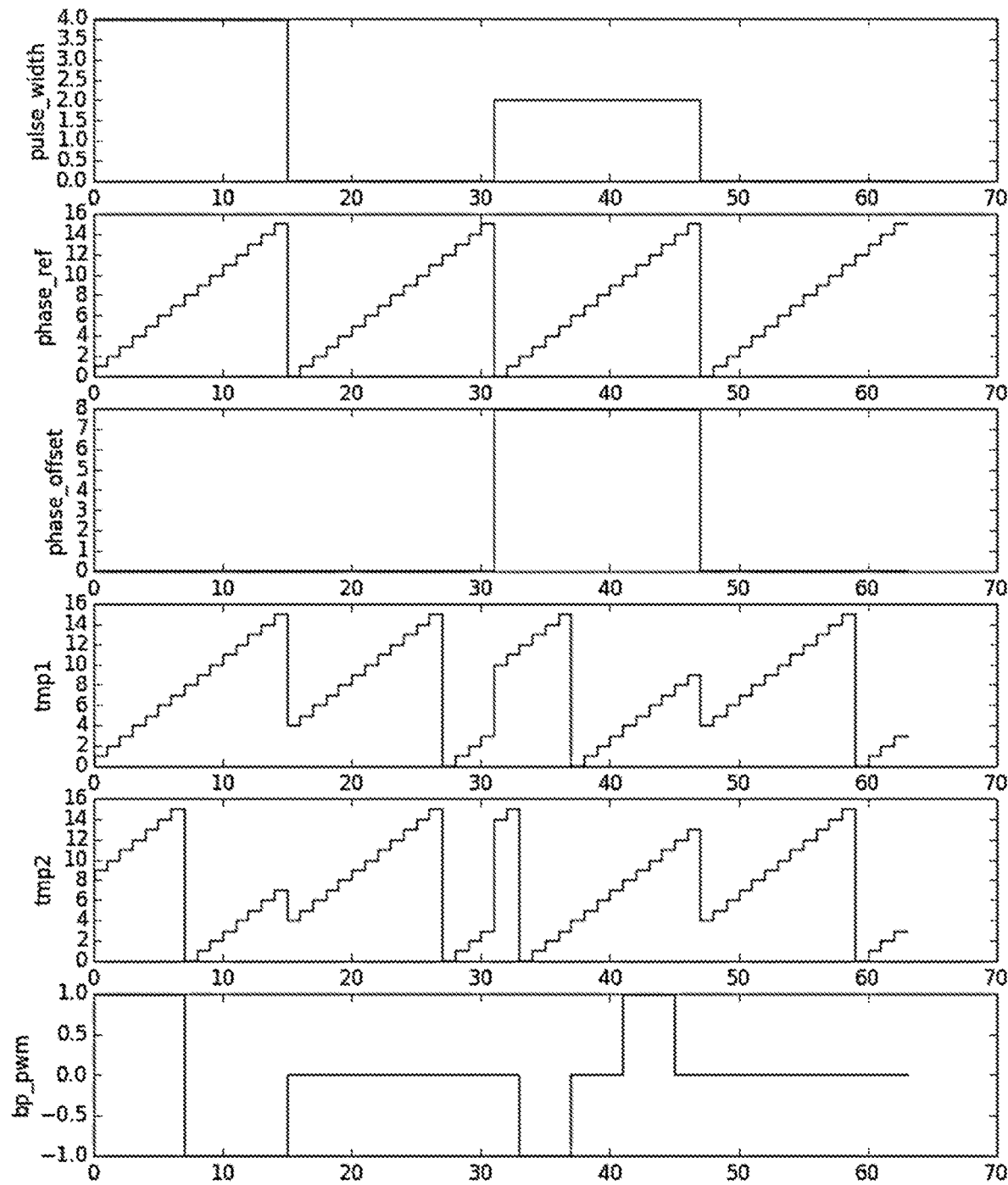
FIG. 5 is a set of timing diagrams illustrating operation of a bandpass pulse-width modulator algorithm according to aspects of the present disclosure.

FIG. 5 shows the inner workings of one described implementation of the BP-PWM unit. The waveforms shown in FIG. 5 correspond exactly to those described in a verilog algorithm discussed below. The purpose of FIG. 5 is to show how the BP-PWM unit 15 can be implemented in a practical manner. The bp_pwm waveform (bottom) is the digital output signal appearing at the output of block 15. It is created by modulo subtraction of the $4^{th}$ bit of tmp1 from tmp2. The tmp1 signal is formed by modulo addition of phase_ref, phase_offset, and the constant 4, followed by modulo subtraction of pulse_width. Similarly, the tmp2 signal is formed by modulo addition of phase_ref, phase_offset, the constant 4, and pulse_width. This describes how the inputs phase_ref, phase_offset, and pulse_width are processed to the bp_pwm signal.

Referring again to FIG. 3, the controller may be specific to a particular application. The controller may be, e.g., a hardware state machine or a programmable microcontroller. By way of example, and not by way of limitation, the controller may include a clock generator to serve as the timebase for waveform generation.

As noted above, the pulse-width setting determines the output RMS sound pressure level. The phase reference may be the output of a counter that increments with each clock edge, and the phase offset determines the absolute phase of the output sound pressure.

The BP-PWM unit 15 determines the output voltage level based on the pulse-width setting, phase reference, and phase offset. One implementation of a BP-PWM unit 15 uses the algorithm described below to produce the modulated output. The algorithm is intended to be representative of the signal processing required to produce the desired waveform and is not the only possible implementation. In this particular algorithm, pulse_width is 3 bits, phase_ref is 4 bits, phase_offset is 4 bits, and bp_pwm is 2 bits. FIG. 5 shows the operation of the algorithm.

input [2:0] pulse_width;
  input [3:0] phase_ref;
  input [3:0] phase_offset;
  wire [3:0] tmp1, tmp2;
  output [1:0] bp_pwm;
  assign tmp1=4−pulse_width+phase_ref+phase_offset;
  assign tmp2=4+pulse_width+phase_ref+phase_offset;
  assign bp_pwm=tmp2[3]−tmp1[3];

The DAC 11 converts a digital signal to the proper analog voltage levels to interface to the transducer. The DAC 11 receives a bp_pwm input signal 17 from the BP-PWM unit 15, and the DAC output 16 is connected across the transducer 10. If the bp_pwm input signal is a 2-bit digital signal, a possible mapping is as follows: The 00 code specifies the transducer 10 has 0 volts across it, the 01 code specifies the transducer has V+ across it, and the 11 code specifies the transducer has V− across it.

Figure 6:
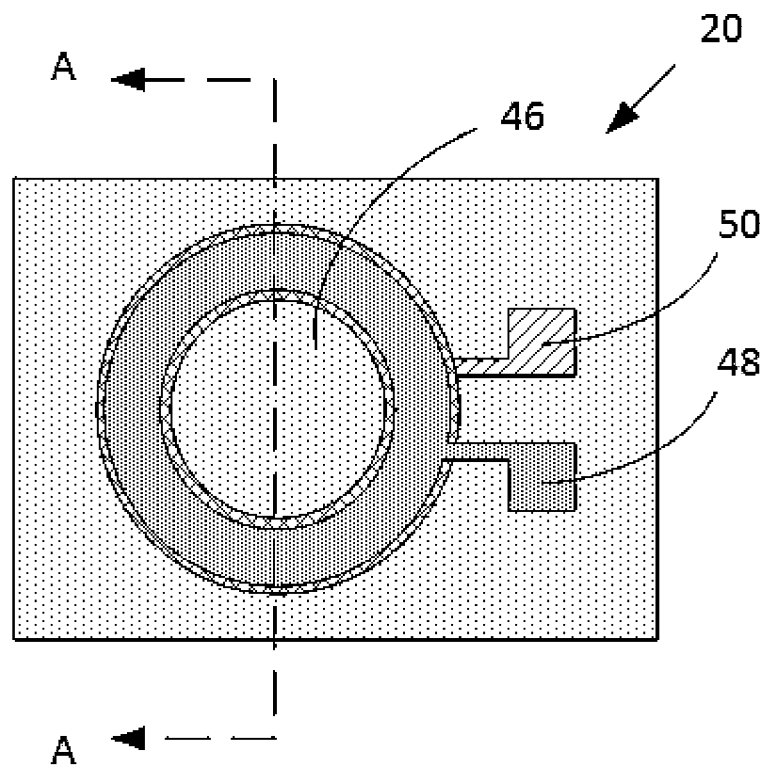
FIG. 6 is a plan view schematic diagram of a micromachined ultrasonic transducer in accordance with aspects of the present disclosure.
Figure 7:
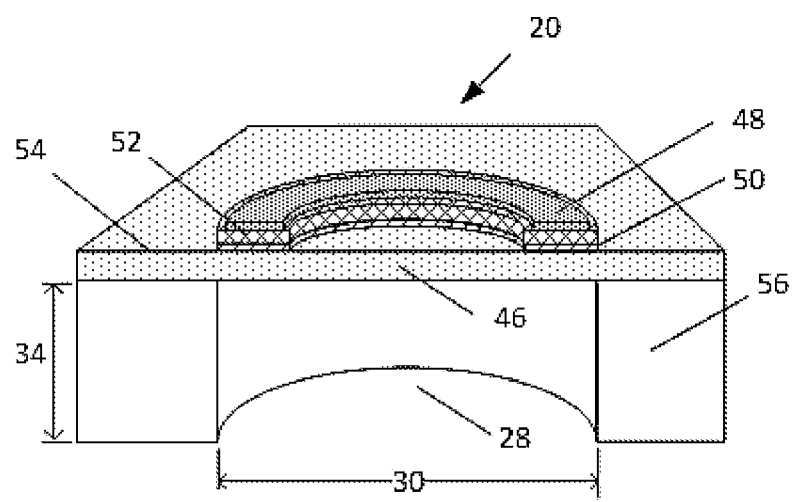
FIG. 7 is a three-dimensional cross-sectional diagram of a micromachined ultrasonic transducer in accordance with aspects of the present disclosure.

The ultrasound transducer 10 may be an electromechanical device that converts an electrical signal into ultrasound. This device may be implemented many ways, including as a micromachined ultrasonic transducer (MUT). FIG. 6 shows a top view of one embodiment of a micromachined ultrasonic transducer 20 that may be used in conjunction with aspects of the present disclosure. FIG. 7 shows a cross-section view of one embodiment of MUT 20, corresponding to a cross-section cut through line AA in FIG. 6. Various types of MUTs have been demonstrated, among which are capacitive MUTs (CMUTs) and piezoelectric MUTs (PMUTs). Each type of MUT consists of a thin diaphragm or membrane 46. The CMUT and PMUT differ in the method used to provide electrical transduction of the membrane vibration: in a CMUT, capacitive transduction is used, whereas in a PMUT piezoelectric transduction is used. FIGS. 6 and 7 show a PMUT with a ring of piezoelectric material 52 spanning the perimeter of membrane 46. A top electrode 48 and bottom electrode 50 provide electrical contacts to piezoelectric ring 52 which transduces vibration of membrane 46 into an electrical signal. When the MUT functions as a transmitter, an electrical signal applied between electrode 48 and electrode 50 produces vibration of membrane 46, launching an acoustic pressure wave.

All cited references are incorporated herein by reference in their entirety. In addition to any other claims, the applicant(s)/inventor(s) claim each and every embodiment of the invention described herein, as well as any aspect, component, or element of any embodiment described herein, and any combination of aspects, components or elements of any embodiment described herein. The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC § 112(f). In particular, the use of "step of" in the claims herein is not intended to invoke the provisions of 35 USC § 112(f).

The invention claimed is:

1. An ultrasonic transmitter system comprising a digital controller configured to generate pulse width and phase reference signals wherein the phase reference signal is in the form of a phase ramp signal, a bandpass pulse-width modulator (BP-PWM) unit configured to receive the pulse width and phase reference signals from the digital controller and generate a pulse width modulation (PWM) output based on the pulse width and phase reference signals, wherein the PWM output is characterized by a pulse width and a phase wherein the BP-PWM is configured to map the phase ramp signal to PWM output and the period of the phase ramp signal is equal to the period of the PWM output, a digital to analog converter (DAC) configured to receive the PWM output from the BP-PWM unit and generate an output characterized by the pulse width and phase, and an ultrasonic transducer configured to receive the output from the DAC and generate an output sound pressure in response to the output from the DAC, wherein an amplitude of the RMS sound pressure depends on the pulse width of the output from the DAC.

2. The system of claim 1, wherein the BP-PWM unit has a programmable pulse width.

3. The system of claim 1, wherein an RMS sound pressure level of the output sound pressure from the ultrasound transducer is determined by an amplitude of the output from the DAC as well as a pulse width setting of PWM output.

4. The system of claim 1, wherein the digital controller is configured to generate a phase offset signal and wherein the BP-PWM unit is configured to receive the phase offset signal and generate the PWM output based on the pulse width, phase reference and phase offset signals, wherein a phase of the output sound pressure from the ultrasound transducer is determined by the phase offset signal.

5. The system of claim 1, wherein the digital controller generates the phase reference signal in the form of a digital phase ramp.

6. The system of claim 1, wherein the ultrasonic transducer is a micromachined piezoelectric ultrasound transducer (PMUT) or a capacitive ultrasonic transducer (CMUT).

7. The system of claim 1, wherein the BP-PWM unit uses quadrature amplitude modulation (QAM) to encode the phase and amplitude of the output sound pressure transmitted by the ultrasonic transducer.

8. The system of claim 7, wherein the QAM encoding of the output sound pressure is a code used to uniquely identify an ultrasound transmitter.

9. The system of claim 7, wherein the QAM encoding of the ultrasound output sound pressure is a message to be transmitted to a second ultrasound transducer that is used as a receiver.

10. The system of claim 1, wherein the BP-PWM unit is used to control the amplitude and phase of the voltage applied to an ultrasonic transducer in order to reduce the ring-down time of the transducer following the transmission of an ultrasonic pulse.

\* \* \* \* \*